United States Patent
Asami et al.

(10) Patent No.: US 10,281,032 B2
(45) Date of Patent: May 7, 2019

(54) TRANSMISSION GEAR CONTROL APPARATUS FOR VEHICLE

(71) Applicant: TOYOTA JIDOSHA KABUSHIKI KAISHA, Toyota-shi, Aichi-ken (JP)

(72) Inventors: Tomohiro Asami, Nisshin (JP); Masakazu Owatari, Nagakute (JP); Takashi Miura, Nisshin (JP); Yuki Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 15/452,849

(22) Filed: Mar. 8, 2017

(65) Prior Publication Data
US 2017/0276240 A1 Sep. 28, 2017

(30) Foreign Application Priority Data
Mar. 22, 2016 (JP) .................. 2016-057042

(51) Int. Cl.
*F16H 61/12* (2010.01)
*F16H 61/04* (2006.01)

(52) U.S. Cl.
CPC ............ *F16H 61/12* (2013.01); *F16H 61/04* (2013.01); *F16H 2061/124* (2013.01); *F16H 2061/1264* (2013.01)

(58) Field of Classification Search
CPC .... F16H 61/04; F16H 61/12; F16H 2061/124; F16H 2061/1264
See application file for complete search history.

(56) References Cited

U.S. PATENT DOCUMENTS

| | | | | |
|---|---|---|---|---|
| 4,819,187 A * | 4/1989 | Yasue | ................ | B60W 10/06 123/435 |
| 5,649,880 A * | 7/1997 | Tsutsui | ................ | B60W 10/06 477/109 |
| 8,165,772 B2 * | 4/2012 | Thor | .................. | F16H 61/12 474/11 |
| 2005/0075773 A1 * | 4/2005 | Schweizer | ............ | B60W 10/02 701/51 |
| 2016/0281616 A1 * | 9/2016 | Hippalgaonkar | ....... | F02D 29/02 |

FOREIGN PATENT DOCUMENTS

JP H05-126246 A 5/1993

* cited by examiner

*Primary Examiner* — David R Morris
(74) *Attorney, Agent, or Firm* — Oliff PLC (57) ABSTRACT

Under an abnormal determination, when a transmission gear stage is switched, a torque limit value is changed from a value before switching of the transmission gear stage to a value after switching thereof in a period in which this transmission gear stage is switched.

6 Claims, 7 Drawing Sheets

|  | C1 | C2 | C3 | C4 | B1 | B2 |
|---|---|---|---|---|---|---|
| 1st | ○ | — | — | — | — | ○ |
| 2nd | ○ | — | — | — | ○ | — |
| 3rd | ○ | — | ○ | — | — | — |
| 4th | ○ | — | — | ○ | — | — |
| 5th | ○ | ○ | — | — | — | — |
| 6th | — | ○ | — | ○ | — | — |
| 7th | — | ○ | ○ | — | — | — |
| 8th | — | ○ | — | — | ○ | — |
| Rev | — | — | ○ | — | — | ○ |

TRANSMISSION GEAR CONTROL APPARATUS FOR VEHICLE

INCORPORATION BY REFERENCE

The disclosure of Japanese Patent Application No. 2016-057042 filed on Mar. 22, 2016 including the specification, drawings and abstract is incorporated herein by reference in its entirety.

BACKGROUND

1. Technical Field

The embodiment relates to a transmission gear control apparatus for an automatic transmission mounted on a vehicle and, in particular, to a transmission gear control apparatus that limits input torque when a hydraulic pressure cannot normally be supplied to a friction engagement element such as a clutch or a brake.

2. Description of Related Art

As an automatic transmission that is mounted on a vehicle such as an automobile, a stepped transmission gear mechanism, to which drive power of an engine is transmitted via a torque converter, has conventionally been used. In this transmission gear mechanism, plural transmission gear stages are established by selectively engaging or disengaging plural friction engagement elements such as a clutch and a brake. In the cases where the friction engagement element that establishes a certain transmission gear stage is disengaged and the friction engagement element that establishes a next transmission gear stage is engaged, the transmission gear stage is switched.

In such an automatic transmission, when a hydraulic pressure cannot normally be supplied due to malfunction of a solenoid valve, for example, excess slippage of the friction engagement element possibly occurs, which leads to a damage thereto. To handle this problem, for example, in the case where abnormality of a control system of the hydraulic pressure is determined on the basis of the slippage of the friction engagement element or the like, a transmission gear control apparatus described in Japanese Patent Application Publication No. 05-126246 (JP 05-126246 A) limits output torque of the engine and suppresses a torque amplifying action of the torque converter, so as to limit input torque to the transmission gear mechanism.

SUMMARY

By the way, in general, the friction engagement element of the transmission gear mechanism has maximum torque capacity that can be transmitted thereby, depending on specification values thereof (the number of friction materials, a coefficient of friction, a spring load, and the like). Accordingly, in the case where the input torque to the transmission gear mechanism is limited as in the conventional example described above, a different value is preferably set as a limit value of the input torque for each of the transmission gear stages. However, when the different limit value is set for each of the transmission gear stages, the limit value is changed in conjunction with switching of the transmission gear stage, which possibly provides a driver with a sense of discomfort.

That is, in the case where the limit value of the input torque is increased in conjunction with an upshift, for example, when the abnormality of the control system of the hydraulic pressure is determined and the input torque is limited as described above, the drive power of the vehicle is initially changed by the upshift. Thereafter, the drive power is increased in spite of a fact that an accelerator operation amount is constant. Due to these two changes in the drive power, the driver receives the sense of discomfort.

The embodiment causes a driver to be less likely to receive a sense of discomfort even with a change in drive power that occurs in conjunction with switching of a transmission gear stage in the case where input torque is limited for each transmission gear stage during occurrence of abnormality.

The embodiment causes a driver to be less likely to receive a sense of discomfort by merging a change in drive power that occurs by a change in a limit value of input torque into a change in the drive power that occurs by switching of a transmission gear stage. That is, a transmission gear control apparatus for an automatic transmission mounted on a vehicle is a target of the embodiment, and the automatic transmission is configured by including a stepped transmission gear mechanism in which the transmission gear stage is switched by engaging or disengaging plural friction engagement elements.

The transmission gear control apparatus includes: abnormality determination means that determines whether a control system of a hydraulic pressure to the friction engagement element is abnormal; torque limit means that sets a limit value of torque input to the transmission gear mechanism (hereinafter also referred to as a torque limit value) for each of the transmission gear stages in the case where it is determined that the control system is abnormal; and limit value changing means that changes the torque limit value from a value before switching of the transmission gear stage to a value after switching thereof when the transmission gear stage is switched. At least a part of a period in which the torque limit value is changed is included in a period in which the transmission gear stage is switched. An aspect of the embodiment can also be defined as a transmission gear control apparatus shown below. A transmission gear control apparatus for an automatic transmission, the automatic transmission being mounted on a vehicle including a stepped transmission gear mechanism configured to switch a transmission gear stage by engaging and disengaging plural friction engagement elements, in which the transmission gear control apparatus includes: an electronic control unit configured to i) determine whether a control system of a hydraulic pressure to the friction engagement element is abnormal, ii) set a limit value of torque input to the transmission gear mechanism for each of the transmission gear stages in the case where it is determined that the control system is abnormal, and iii) change the limit value from a value before switching of the transmission gear stage to a value after switching thereof such that at least a part of a period in which the limit value is changed is included in a period in which the transmission gear stage is switched when the transmission gear stage is switched.

With the matters used to specify the embodiment, in the case where it is determined that the control system of the hydraulic pressure of the automatic transmission is abnormal, the torque limit means sets the limit value of the input torque for each of the transmission gear stages. In this way, excess slippage of the friction engagement element can be prevented, in addition, when the transmission gear stage is switched in accordance with a change in a vehicle speed or the like in such a situation, for example, the limit value changing means changes the torque limit value from the value before switching of the transmission gear stage to the value after switching thereof.

As described above, at least the part of the period in which the torque limit value is changed is included in the period in which the transmission gear stage is switched. Thus, a change in drive power of the vehicle that occurs by a change in the torque limit value is merged into a change in the drive power that occurs by switching of this transmission gear stage. That is, a driver once feels the change in the drive power that occurs in conjunction with switching of the transmission gear stage, but is less likely to feel the change in the drive power thereafter. Thus, the driver is less likely to receive a sense of discomfort.

The torque limit value may be changed to the value after switching of the transmission gear stage before switching of the transmission gear stage is terminated. In this way, the drive power of the vehicle is not changed even in the case where an accelerator operation amount is constant after switching of the transmission gear stage is terminated.

The change in the torque limit value may be terminated before an inertia phase is terminated and differential rotation between an input side and an output side of an engaged friction engagement element becomes zero (that is, before the friction engagement element stops slipping) in the period in which the transmission gear stage is switched. Note that whether the differential rotation is generated in the friction engagement element may be determined on the basis of whether a difference in a rotational speed between the input side and the output side thereof is equal to or larger than a threshold that is set in advance (may be set to zero or a specified value close to zero).

Timing at which the change in the torque limit value is started may preferably be timing after a torque phase is terminated and differential rotation between an input side and an output side of a disengaged friction engagement element is generated (that is, after friction engagement element starts slipping) in the period in which the transmission gear stage is switched in the case where the torque limit value after switching of the transmission gear stage is larger than the torque limit value before switching thereof. In this way, there is no worry that excess torque is applied to the friction engagement element before being disengaged in the torque phase. Thus, the excess slippage thereof can be prevented.

In such a case, the change in the torque limit value is preferably started immediately after termination of the torque phase, and may be set at a time point at which the torque phase is terminated, for example. In this way, the torque limit value can gradually be changed during the inertia phase, and the change in the drive power of the vehicle that occurs thereby also becomes gradual.

Meanwhile, in the case where the torque limit value after switching of the transmission gear stage is smaller than the torque limit value before switching thereof, the change in the torque limit value may be started before the torque phase is terminated, that is, the differential rotation between the input side and the output side of the disengaged friction engagement element is generated. In the case where the torque limit value is reduced in conjunction with switching of the transmission gear stage, there is no worry that the excess torque is applied to the friction engagement element even when the torque limit value is changed in the torque phase.

According to the transmission gear control apparatus for the vehicle according to the embodiment, when the control system of the hydraulic pressure to the friction engagement element of the automatic transmission is abnormal, the excess slippage of the friction engagement element is prevented by limiting the input torque for each of the transmission gear stages. In addition, when the transmission gear stage is switched, the torque limit value is changed such that at least the part of the period in which the torque limit value is changed overlaps the period in which the transmission gear stage is switched. In this way, the change in the drive power that occurs by the change in the torque limit value can be merged into the change in the drive power that occurs in conjunction with switching of the transmission gear stage. In this way, the driver is less likely to receive the sense of discomfort.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A description will hereinafter be made on one embodiment on the basis of the drawings. In this embodiment, a description will be made on a case where the embodiment is applied to an FF (front-engine, front-wheel-drive) vehicle on which an automatic transmission is mounted. First, a description will be made on an overall configuration of a powertrain of the vehicle.

Figure 1:
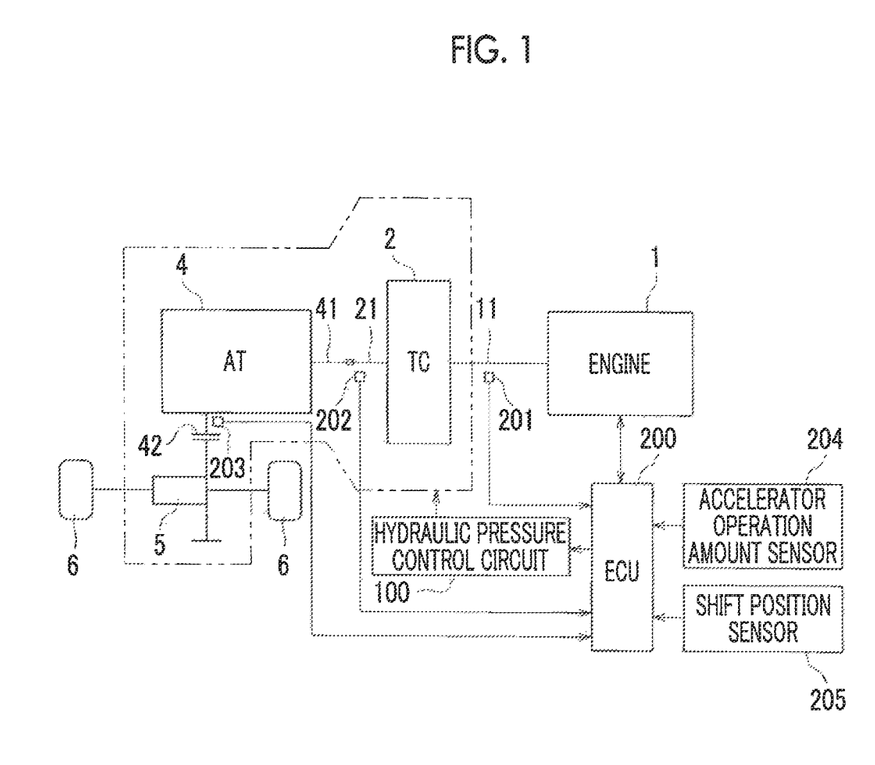
FIG. 1 is a schematic configuration diagram of a powertrain of a vehicle according to one embodiment.

FIG. 1 is a schematic configuration diagram of the powertrain of the vehicle according to this embodiment. This vehicle includes an engine 1, a torque converter (TC) 2, an automatic transmission (AT) 4, a differential device 5, drive wheels (front wheels) 6, driven wheels (rear wheels: not shown), a hydraulic pressure control circuit 100, an electronic control unit (ECU) 200, and the like. As one example, the engine 1 is a multi-cylinder gasoline engine, and a crankshaft 11 as an output shaft thereof is coupled to the torque converter 2. A rotational speed of the crankshaft 11 (an engine speed Ne) is detected by an engine speed sensor 201.

Although details are not shown, the torque converter 2 is a known torque converter that includes: a pump impeller on an input shaft side; a turbine runner on an output shaft side; and a stator that realizes a torque amplifying function, and that transmits power between the pump impeller and the turbine runner via a fluid. A rotational speed of a turbine shaft 21 of the torque converter 2 (a turbine rotational speed Nt) is detected by a turbine rotational speed sensor 202.

The automatic transmission 4 is configured by including a known stepped transmission gear mechanism and includes plural hydraulic friction engagement elements, a planetary gear device, and the like. In the automatic transmission 4, the plural friction engagement elements are selectively engaged, and thereby plural gear stages (transmission gear stages) can selectively be established. As shown in FIG. 1, an input shaft 41 of the automatic transmission 4 is coupled to the turbine shaft 21 of the torque converter 2. Meanwhile, an output gear 42 of the automatic transmission 4 is coupled to the drive wheels 6 via the differential device 5. A rotational speed of the output gear 42 (an output rotational speed No) is detected by an output rotational speed sensor 203.

Figure 2:
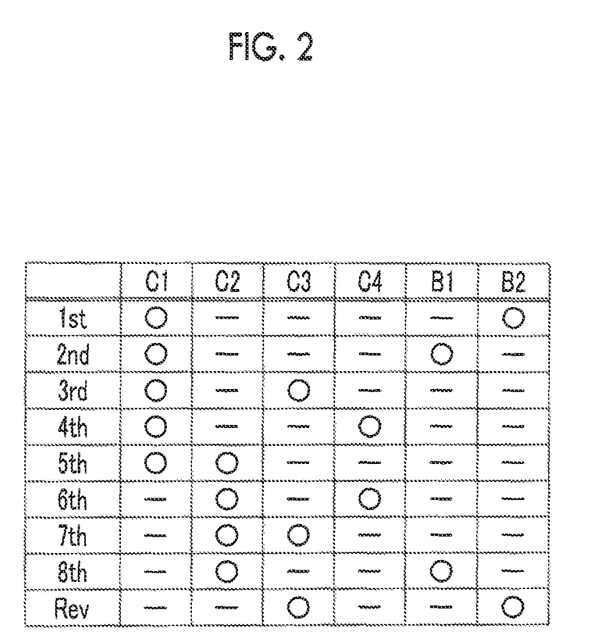
FIG. 2 is a table that represents engagement states of friction engagement elements at each gear stage in an automatic transmission.
Figure 3:
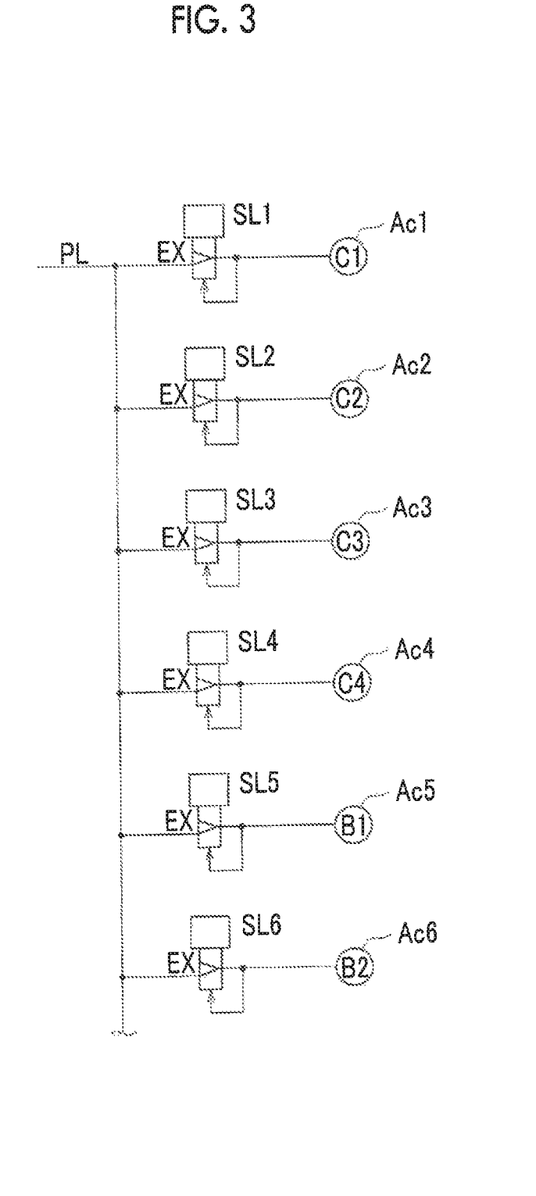
FIG. 3 is a schematic configuration diagram of a portion of a hydraulic pressure control circuit that controls the friction engagement elements.

As shown in FIG. 2 and FIG. 3, the automatic transmission 4 of this embodiment includes four clutches C1 to C4 and two brakes B1, B2 as the friction engagement elements. When these components are selectively engaged, any of eight forward gear stages (a first gear stage "1st" to an eighth gear stage "8th") and a reverse gear stage (a reverse gear stage "Rev") is established. Note that FIG. 2 is an engagement table that represents a condition for establishing each of the gear stages. A circle represents "engagement", and no mark represents "disengagement".

The engagement and the disengagement of the plural friction engagement elements (the clutches C1 to C4 and the brakes B1, B2) as in FIG. 2 are controlled by the hydraulic pressure control circuit 100. FIG. 3 is a circuit diagram of linear solenoid valves SL1 to SL6 in the hydraulic pressure control circuit 100, the linear solenoid valves SL1 to SL6 respectively supplying controlled hydraulic pressure to hydraulic actuators Ac1 to Ac6 of the friction engagement elements. Note that a circuit that controls the torque converter 2 and the like is not shown.

The linear solenoid valves SL1 to SL6 basically have the same configuration, are individually excited or unexcited by the ECU 200, regulate a line hydraulic pressure PL, and directly supply the regulated line hydraulic pressure PL to the hydraulic actuators Ac1 to Ac6, respectively. In this way, engagement hydraulic pressures of the friction engagement elements are individually regulated, and thus the gear stages are established as represented in the engagement table of FIG. 2. When the gear stage is switched, a clutch-to-clutch gear change is performed by switching the friction engagement element on a disengagement side and the friction engagement element on an engagement side (will be described below).

Note that the friction engagement element on the disengagement side is the friction engagement element that is disengaged upon switching of the gear stage. For example, in the engagement table of FIG. 2, the brake B1 corresponds to the friction engagement element on the disengagement side for an upshift of second gear third gear, and the clutch C3 corresponds to the friction engagement element on the disengagement side for an upshift of the third gear fourth gear. Similarly, the friction engagement element on the engagement side is the friction engagement element that is engaged upon switching of the gear stage. The clutch C3 corresponds to the friction engagement element on the engagement side for the upshift of the second gear→the third gear, and the clutch C4 corresponds to the friction engagement element on the engagement side fir the upshift of the third gear→the fourth gear.

The ECU 200 includes a CPU, a ROM, a RAM, a backup RAM, a timer, and the like. The ROM stores various control programs, a map that is referred during execution of the control programs, and the like. The CPU executes computation processing on the basis of the various control programs and the map stored in the ROM. The RAM is a memory that temporarily stores a computation result of the CPU, data input from each of the sensors, and the like. The backup RAM is a non-volatile memory that stores data to be stored and the like during a stop of the engine 1.

As shown in FIG. 1, in addition to the engine speed sensor 201, the turbine rotational speed sensor 202, and the output rotational speed sensor 203 described above, sensors that include: an accelerator operation amount sensor 204 that detects an operation amount of an accelerator pedal, which is not shown, (an accelerator operation amount Acc); a shift position sensor 205 that detects a position of a shift lever; and the like are connected to the ECU 200. The ECU 200 receives signals from these various sensors (including switches).

Based on the signals from the various sensors, the ECU 200 controls a throttle opening degree, a fuel injection amount, ignition timing, and the like of the engine 1. In this way, the ECU 200 controls an operation state of the engine 1. In addition, the ECU 200 controls the hydraulic pressure control circuit 100 in accordance with the operation state of the vehicle, engages and disengages the plural friction engagement elements of the automatic transmission 4 as described above, and thereby establishes the appropriate one of the gear stages (the first gear stage to the eighth gear stage and the reverse gear stage). Note that, while the single ECU 200 is shown in FIG. 1, the ECU 200 may be configured by including plural ECUs for purposes of engine control, transmission control, and the like when necessary.

In this embodiment, when the shift lever is operated in a drive range, for example, the automatic transmission 4 is brought into an automatic gear change mode (an automatic mode), and a favorable gear stage is selected with reference to a gear change map, which is not shown, on the basis of the operation state of the vehicle and the like. Note that the gear change map takes an aspect of a gear change chart that has a vehicle speed V and the accelerator operation amount Acc (or the throttle opening degree) as parameters, and is stored in the ROM of the ECU 200.

More specifically, the ECU 200 computes the vehicle speed V on the basis of the signal from the output rotational speed sensor 203 (the output rotational speed No) and determines a target gear stage with reference to the gear change map on the basis of this vehicle speed V and the signal from the accelerator operation amount sensor 204 (the accelerator operation amount Acc). The ECU 200 also determines a current gear stage on the basis of the signal from the turbine rotational speed sensor 202 (the turbine rotational speed Nt) and the output rotational speed No.

When these current gear stage and target gear stage differ from each other, the ECU 200 switches the gear stage as will be described below. That is, in the cases where the current gear stage is the third gear stage, for example, and the vehicle speed V is increased and crosses a 3→4 upshift line in the gear change chart as schematically indicated by an arrow A1 in FIG. 4, the target gear stage that is computed from the gear change map is the fourth gear. Thus, a control signal that is used to set the fourth gear stage is output to the hydraulic pressure control circuit 100 of the automatic transmission 4, and thereby the upshift from the third gear to the fourth gear is performed.

Switching of the gear stage, just as described, is performed through the so-called clutch-to-clutch gear change. A specific description will hereinafter be made on the above upshift of the third gear the fourth gear with reference to a timing chart in FIG. 5. For example, in the cases where the accelerator pedal is operatively depressed and the vehicle speed V increases and crosses the 3→4 upshift line (on-upshift), the control signal that is used to set the fourth gear stage as the new target gear stage is output from the ECU 200 to the hydraulic pressure control circuit 100 (time t1).

Figure 5:
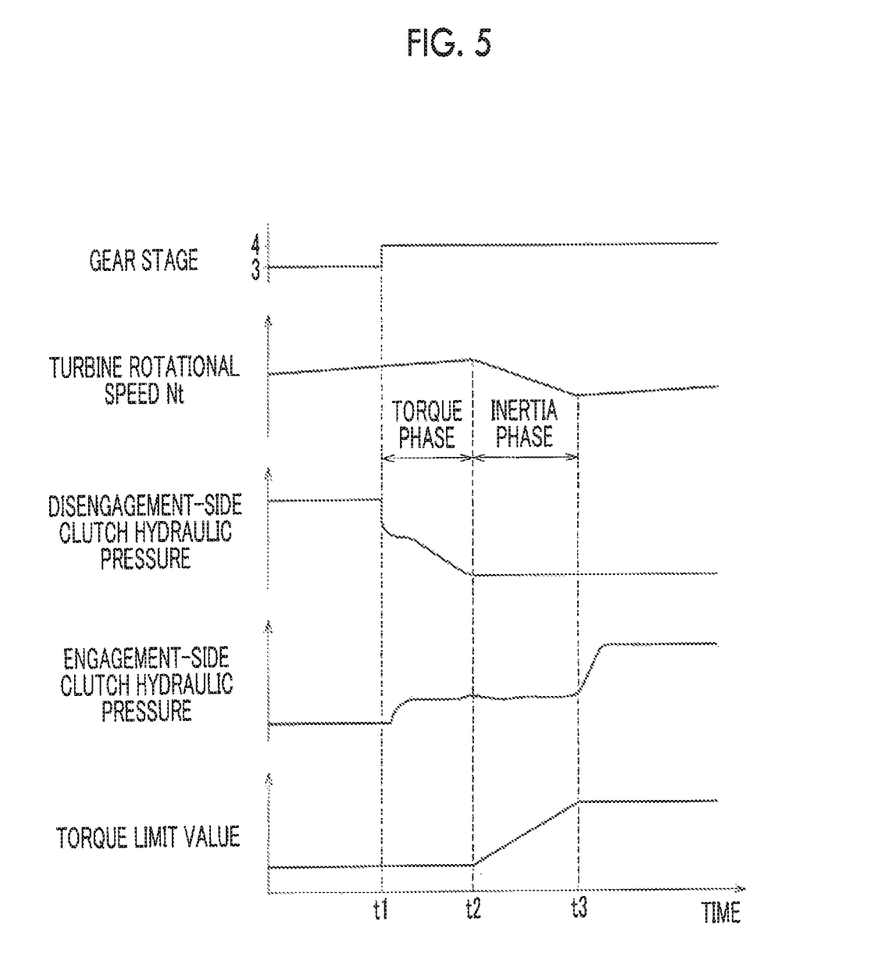
FIG. 5 is a timing chart that represents a change in a torque limit value that corresponds to changes in a turbine rotational speed and a clutch hydraulic pressure during the on-upshift and periods of a torque phase and an inertia phase.

In response to the above, a hydraulic pressure of the clutch C3 as the friction engagement element on the disengagement side (a disengagement-side clutch hydraulic pressure) is reduced, and a hydraulic pressure of the clutch C4 as the friction engagement element on the engagement side (an engagement-side clutch hydraulic pressure) is increased. However, at an initial stage, the clutch C3 does not slip and thus enters a torque phase. Note that a time of this torque phase corresponds to input torque to the automatic transmission 4 and a change in a gear ratio before and after switching (a gear ratio step), for example, is experimentally computed in advance, and is stored as a map of a torque phase time in the ROM of the ECU 200.

After a lapse of the torque phase time (at time t2), the clutch C3 on the disengagement side starts slipping (that is, both of the clutches C3, C4 on the disengagement side and the engagement side start slipping), and an inertia phase begins. Then, the turbine rotational speed Nt starts being reduced. In this inertia phase, the engagement-side clutch hydraulic pressure is controlled on the basis of a torque share rate of the clutch C4, and the like. Note that slippage of the friction engagement element can be defined on the basis of differential rotation between an input side and an output side thereof. For example, when the differential rotation is equal to or higher than a threshold (zero or a specified value close to zero) that is set in advance, the slippage occurs.

When the turbine rotational speed Nt is gradually reduced in the inertia phase as described above and an inertia phase time that is set in advance elapses, the turbine rotational speed Nt shows an appropriate value for the gear stage after switching. Note that, similar to the torque phase time, the inertia phase time is set as a map of the inertia phase time that corresponds to the input torque and the gear ratio step, for example, and is stored in the ROM of the ECU 200.

Accordingly, the engagement-side clutch hydraulic pressure is increased to a maximum value after a lapse of the inertia phase time (at time t3), and the clutch C4 stops slipping. Then, switching from the third gear stage to the fourth gear stage is terminated. Note that, although not shown, also in the case where the vehicle speed V crosses a 4→3 downshift line due to a reduction in the vehicle speed V in such a situation where the operation amount of the accelerator pedal is not significantly changed (off-downshift), for example, an initial stage of a gear change period is the torque phase and is thereafter shifted to the inertia phase.

Figure 4:
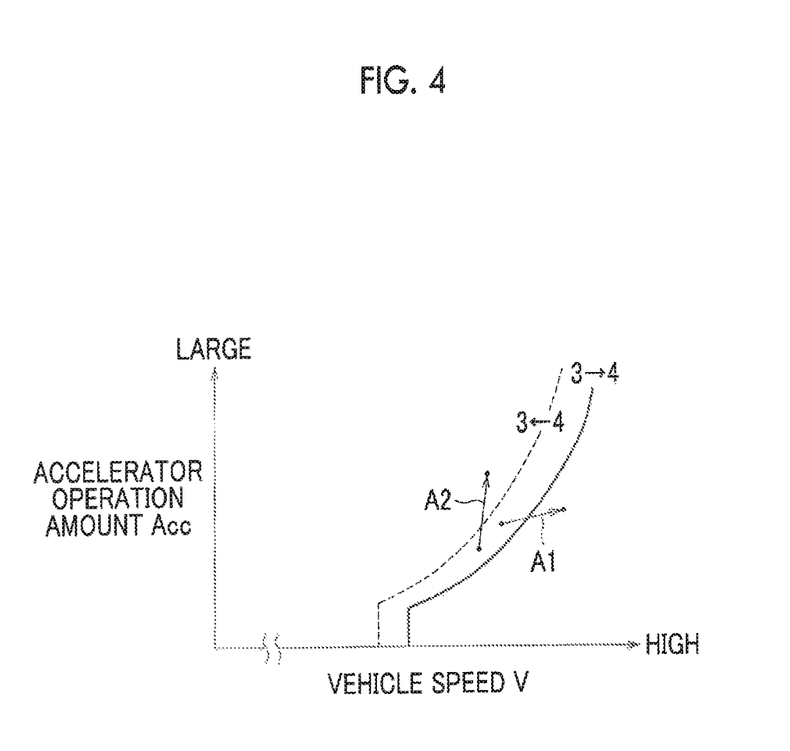
FIG. 4 is an image chart that schematically illustrates on-upshift and on-downshift on a gear change chart.

Meanwhile, in the cases where the operation amount of the accelerator pedal is rapidly increased and the vehicle speed V crosses the 4→3 downshift line as indicated by an arrow A2 in FIG. 4 (on-downshift), a control signal that is used to set the third gear stage as the new target gear stage is output from the ECU 200 to the hydraulic pressure control circuit 100. In response to this, the hydraulic pressure of the clutch C4 on the disengagement side is reduced, and the hydraulic pressure of the clutch C3 on the engagement side is increased. Then, both of these clutches start slipping. That is, although not shown, in a case of the on-downshift, the inertia phase begins from the initial stage of the gear change, and the turbine rotational speed Nt is gradually increased.

Then, when the inertia phase time that is set in advance elapses and the turbine rotational speed Nt shows the appropriate value for the gear stage after switching, the hydraulic pressure of the clutch C3 on the engagement side is increased to the maximum value, and the clutch C3 stops slipping. In this way, the torque phase begins. Thereafter, when the torque phase time elapses, the clutch C4 is disengaged, and switching from the fourth gear stage to the third gear stage is terminated. Note that, also in the cases where the accelerator pedal is abruptly released and the vehicle speed V crosses the 4→3 downshift line (the off-downshift), for example, the inertia phase begins from the initial stage of the gear change and is thereafter shifted to the torque phase.

In this embodiment, the ECU 200 that executes the gear change control as described above diagnoses malfunction of the linear solenoid valves SL1 to SL6 of the hydraulic pressure control circuit 100 and the like, for example. In the case where the ECU 200 determines such failure that the hydraulic pressure cannot normally be supplied occurs to any of the friction engagement elements (the clutches C1 to C4 and the brakes B1, B2) of the automatic transmission 4, for example, the ECU 200 limits the input torque so as to prevent the excess slippage of the failed friction engagement element.

As one example, a description will be made with reference to a flowchart in FIG. 6. In step ST101, it is determined whether the shift lever is in the drive range on the basis of the signal from the shift position sensor 205. If a negative determination is made (NO), the process proceeds to step ST105, which will be described below. On the other hand, if a positive determination is made (YES), the process proceeds to step ST102, and it is determined whether it is currently in a specified power-on state, that is, it is currently in such a state where the torque applied to the friction engagement element is increased to be equal to or higher than a specified value.

If a negative determination is made (NO), the process proceeds to step ST105, which will be described below. On the other hand, if a positive determination is made (YES), the process proceeds to step ST103, and a determination on whether a transmission gear ratio is significantly deviated (a failure determination) is made for each of the gear stages. That is, in the case where the gear stage (the target gear stage) that is computed on the basis of the vehicle speed V and the accelerator operation amount Acc is the third gear stage, for example, a ratio of the turbine rotational speed Nt and the output rotational speed No is computed as an actual transmission gear ratio. Then, this actual transmission gear ratio is compared with the transmission gear ratio of the third gear stage, and it is determined whether a deviation between these ratios (an absolute value) is larger than a set value.

If the deviation is equal to or smaller than the set value, it is determined that the clutch C1 and the clutch C3 for constituting the third gear stage each have expected transmission torque capacity (are not failed). On the other hand, if the deviation is larger than the set value, it is determined that at least one of the clutch C1 and the clutch C3 slips significantly and thus does not have the expected transmission torque capacity (is failed).

In following step ST104, a result of the determination as described above is stored in the RAM of the ECU 200 for each of the gear stages. If it is determined that at least one of the gear stages is failed, a flag indicative of this fact (a fail flag) is turned on, and this fact is also stored in the RAM of the ECU 200. Then, it is determined in step ST105 whether the determination results in step ST104 are Obtained for all of the gear stages (the first gear stage to the eighth gear stage and the reverse gear stage). If a negative determination is made (NO), the process returns.

On the other hand, if the determination results are obtained for all of the gear stages and thus a positive determination is made (YES), the process proceeds to step ST106, and a limit value of the input torque (a torque limit value) is set for each of the gear stages. That is, in the cases where the failure determination is made for the third gear stage, the seventh gear stage, and the reverse gear stage and the failure determination is not made for the first gear stage, the second gear stage, the fourth gear stage, and the fifth gear stage, for example, it is determined that the clutch C3 does not have the expected transmission torque capacity.

In such a case, the limit value of the input torque is set for each of the third gear stage, the seventh gear stage, and the reverse gear stage on the basis of specification values of the clutch C3, and the routine is terminated (end). This torque limit value is experimentally set in advance for each of the gear stages on the basis of the specification values (the number of friction materials, a coefficient of friction, a spring load, and the like) of each of the friction engagement elements other than the clutch C3, and is stored in the RUM of the ECU 200.

In above step ST106, similar to the case where failure of the clutch C3 is determined for the third gear stage, a favorable torque limit value that corresponds to the friction engagement element whose failure is determined is set for all of the gear stages. This torque limit value is referred during the control of the engine 1, for example, and control amounts, such as the throttle opening degree, the fuel injection amount, and the ignition timing, are thereby limited. In this way, output of the engine 1 is limited.

Because the input torque to the automatic transmission 4 is limited as described above, the torque applied to the failed friction engagement element (for example, the clutch C3) is reduced. Thus, even when the transmission torque capacity thereof is reduced, the excess slippage thereof does not occur, and a limp home travel of the vehicle can be made. Note that, as the limitation on the input torque to the automatic transmission 4, in addition to the limitation on the output of the engine 1 as described above, a torque amplifying action of the torque converter 2 can be limited.

Figure 6:
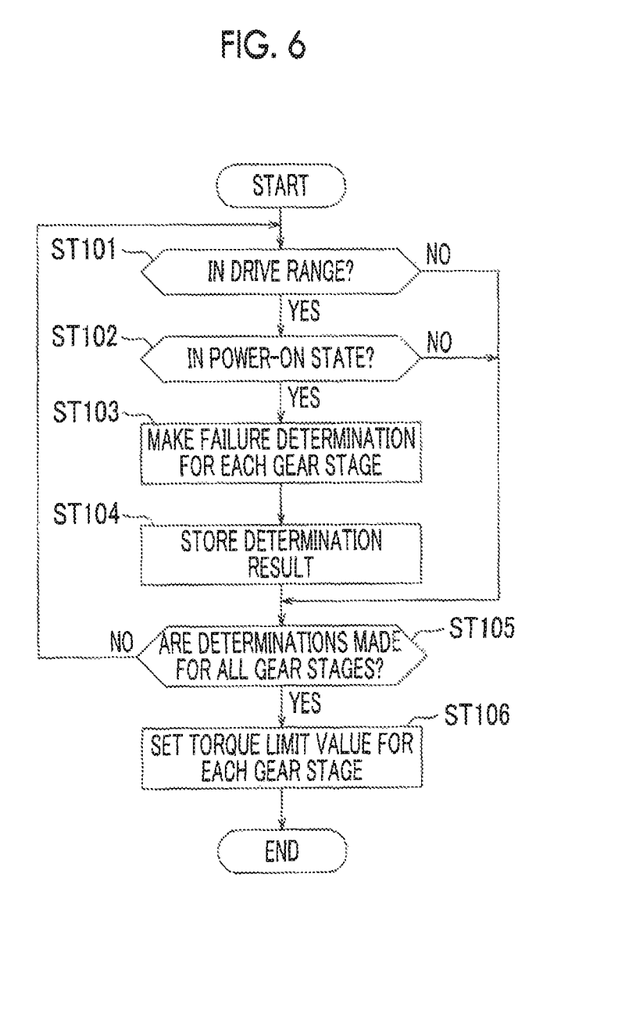
FIG. 6 is a flowchart that illustrates procedures of a failure determination and setting of the torque limit value for each of the gear stages by the hydraulic pressure control circuit.

By executing steps ST101 to ST103 in the flowchart of FIG. 6, the ECU 200 constitutes abnormality determination means that determines abnormality of a control system of the hydraulic pressure to the friction engagement elements of the automatic transmission 4. In addition, by executing step ST106, the ECU 200 constitutes torque limit means that sets the torque limit value of the input torque to the automatic transmission 4 for each of the gear stages when it is determined that the control system is abnormal.

By the way, in the case where the different torque limit value is set for each of the gear stages as described above, the torque limit value is changed in conjunction with switching of the gear stage, which possibly provides a driver of the vehicle with a sense of discomfort. For example, in the case where the torque limit value is increased in conjunction with the above-described upshift of the third gear→the fourth gear with reference to FIG. 5, the drive power of the vehicle is initially changed by the upshift. Thereafter, the drive power is increased in spite of a fact that the operation amount of the accelerator pedal is constant. Due to these two changes in the drive power, the driver tends to receive the sense of discomfort.

To handle this problem, in this embodiment, the torque limit value is changed in a period in which the gear stage is switched as described above. Then, the change in the drive power that occurs by this change in the torque limit value is merged into the change in the drive power that occurs by switching of the gear stage. For example, as represented in a lower portion of FIG. 5, in the case of the above upshift of the third gear→the fourth gear (the on-upshift), the torque limit value starts being changed at a time point at which the torque phase at the initial stage is terminated, and is terminated before the termination of the inertia phase.

A description will hereinafter be made on a procedure of changing the torque limit value as described above (a changing routine of the torque limit value) with reference to a flowchart in FIG. 7. This routine is repeatedly executed at specified timing during a travel of the vehicle. In first step ST201 after the start of the routine, it is determined whether the failure determination is made on at least one of the gear stages (is the failure present?) in the above-described setting routine of the torque limit value (step ST104) with reference to FIG. 6.

That is, it is determined whether the fail flag is on. If a negative determination is made (NO), the routine is terminated. On the other hand, if a positive determination is made that the failure is present (YES), the process proceeds to step ST202, and it is then determined whether the gear stage is currently switched (is the gear currently changed?). For example, such a determination is made in accordance with on/off of a flag indicative of whether the gear stage is currently switched. If a negative determination is made that the gear stage is not currently switched (NO), the routine is terminated.

On the other hand, if a positive determination is made that the gear stage is currently switched (YES), the process proceeds to step ST203, and it is determined whether it is currently time before beginning of the torque phase. If a negative determination is made (NO), the process proceeds to step ST205, which will be described below. On the other hand, if a positive determination is made (YES), the process proceeds to step ST204, the torque limit value that corresponds to the gear stage before switching is set as a target value, and the process proceeds to step ST208, which will be described below. In the case of the above-described upshift of the third gear→the fourth gear (the on-upshift) with reference to FIG. 5, it is currently the time before beginning of the torque phase at the initial stage of the gear change (time before the time t1), and the torque limit value before switching of the gear stage is set as the target value.

On the other hand, if a negative determination is made in step ST203 that it is currently not the time before the torque phase (NO), the process proceeds to step ST205, and it is determined whether it is currently in the torque phase. If a positive determination is made (YES), the process proceeds to step ST206. Here, a smaller one of the torque limit values before and after switching of the gear stage is set as the target value, and the process proceeds to step ST208, which will be described below. In the case of the above-described upshift of the third gear→the fourth gear, the torque limit value before switching is smaller than the torque limit value after switching. Thus, the torque limit value before switching of the gear stage is set as the target value during the torque phase (from the time t1 to t2).

That is, the clutch C3 on the disengagement side, in other words, the friction engagement element before switching of the gear stage is in an engaged state in the torque phase at the initial stage of the gear change. Accordingly, in the case where the large torque limit value before switching of the gear stage is set as the target value, the excess torque is possibly applied thereto. To handle this problem, the small torque limit value before switching of the gear stage is set during the torque phase. In this way, the damage to the friction engagement element, which is caused by application of the excess torque, can be prevented in advance.

Meanwhile, if a negative determination is made in step ST205 that it is not currently in the torque phase (NO), the process proceeds to step ST207, the torque limit value that corresponds to the gear stage after switching is set as the target value, and the process proceeds to step ST208. In the ease of the above-described upshift of the third gear the fourth gear, a fact that it is not currently in the torque phase means that the torque phase is terminated (the time t2) and the inertia phase begins. Here, the torque limit value that corresponds to the gear stage after switching is set as the target value.

Note that termination of the torque phase may be determined on the basis of the lapse of the torque phase time or may be determined from a change in the turbine rotational speed Nt. Alternatively, the termination of the torque phase can be determined from a change in the disengagement-side clutch hydraulic pressure. By changing the target value at the time point at which the torque phase is terminated, just as described, the torque limit value starts being changed as will be described below, and thus the torque limit value is gradually changed during the inertia phase.

After the target value is set in any of steps ST204, ST206, ST207, it is determined in step ST208 whether the current torque limit value is larger than the target value. If a positive determination is made (YES), the process proceeds to step ST209, and the torque limit value is gradually increased (swept) to the target value. In this way, when the inertia phase begins as shown in FIG. 5 (the time t2 onward), the torque limit value is gradually increased.

On the other hand, if a negative determination is made in step ST208 that the current torque limit value is equal to or smaller than the target value (NO), the process proceeds to step ST210, and the target value is set as the torque limit value. That is, as shown in FIG. 5, at a time point at which the inertia phase is terminated (the time t3), the torque limit value reaches the target value, and the routine is terminated (end).

Figure 7:
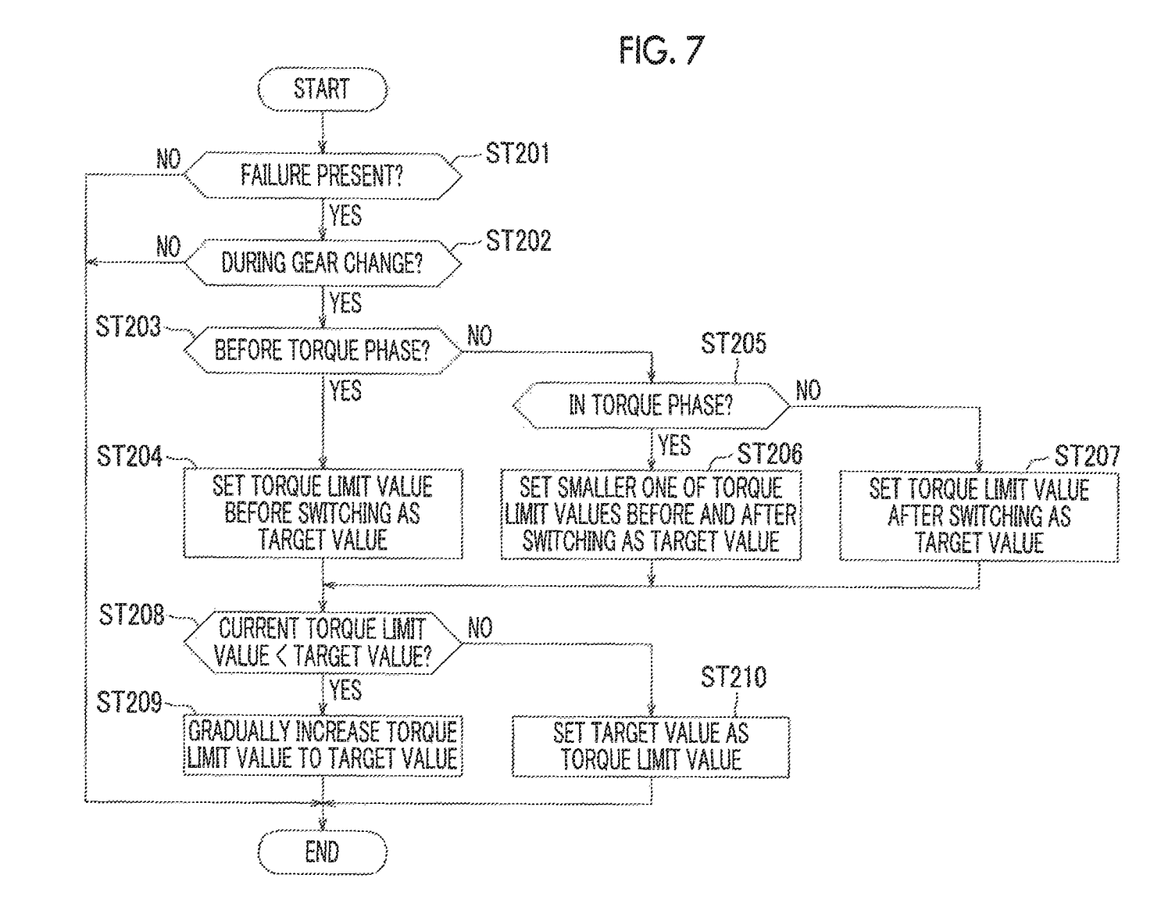
FIG. 7 is a flowchart that illustrates a changing routine of the torque limit value that is associated with switching of the gear stage.

By executing steps ST203 to ST210 in the flowchart of FIG. 7, the ECU 200 constitutes limit value changing means that changes the limit value of the input torque from the value before switching of the gear stage to the value after switching thereof when the gear stage of the automatic transmission 4 is switched. As described above with reference to FIG. 5, the period in which the torque limit value is changed is included in the period in which the gear stage is switched.

Thus, according to the transmission gear control apparatus for the vehicle according to this embodiment, first, in the case where the abnormality of the hydraulic pressure control circuit 100 of the automatic transmission 4 is determined, the torque limit value is set for the input torque to the automatic transmission 4 for each of the gear stages by limiting the output of the engine 1 and the like. In this way, the excess slippage of the friction engagement elements (the clutches C1 to C4 and the brakes B1, B2) can be prevented.

When the gear stage is switched in accordance with the change in the vehicle speed V and the like in such a situation, for example, the torque limit value is changed from the value before switching of the gear stage to the value after switching thereof in such a period. That is, the change in the drive power that occurs by the change in the torque limit value is merged into the change in the drive power of the vehicle that occurs by switching of the gear stage. Accordingly, the driver of the vehicle once feels the change in the drive power that occurs in conjunction with switching of the gear stage, but is less likely to feel the change in the drive power thereafter (that is, is less likely to receive the sense of discomfort).

In particular, in this embodiment, as described above with reference to FIG. 5, the change in the torque limit value is terminated before the inertia phase is terminated and the friction engagement element on the engagement side (the clutch C4 in the example of FIG. 5) stops slipping. Accordingly, the drive power is not changed after switching of the gear stage is terminated, and thus the driver is less likely to receive the sense of discomfort.

In addition, in the case of the on-upshift as shown in FIG. 5, the torque limit value is not changed until the torque phase at the initial stage of the gear change is terminated in consideration of the increase in the torque limit value after switching of the gear stage. Then, the torque limit value starts being changed immediately after the termination of the torque phase. Accordingly, the torque limit value can gradually be changed during the inertia phase. Thus, the change in the drive power that occurs by this change in the torque limit value becomes gradual. Therefore, the driver is further less likely to receive the sense of discomfort.

Note that, although a detailed description will not be made, similar to the case of the on-upshift, the initial stage of the gear change becomes the torque phase in a case of the off-downshift, and the torque limit value before switching is used in the time before this torque phase (YES in step ST204 in the flow of FIG. 7). However, the torque limit value after switching of the gear stage is smaller than the torque limit value before switching in this case. Thus, when the torque phase begins (YES in ST205), the torque limit value after switching is immediately set as the target value.

Then, the negative determination is made in step ST208 (NO), and the target value is set as the torque limit value after switching in step ST210. In this way, in the torque phase at the initial stage of switching of the gear stage, the torque limit value is changed to the value after switching. Just as described, also in the case of the off-downshift, the torque limit value is changed in the period in which the gear stage is switched. In this way, the change in the drive power of the vehicle that occurs by the change in the torque limit value is merged into the change in the drive power that occurs by switching of the gear stage.

In the case of the on-downshift, the initial stage of the gear change is the inertia phase. Accordingly, during the inertia phase (YES in ST204), the torque limit value is maintained to be the torque limit value before switching of the gear stage. Then, when the torque phase begins (YES in ST205), the smaller torque limit value, that is, the torque limit value after switching of the gear stage is set as the target value. Also at this time, the negative determination is made in step ST208 (NO), and the target value is set as the torque limit value after switching in step ST210. As described above, because the torque limit value is changed in the period in which the gear stage is switched, the change in the drive power of the vehicle that occurs by the change in the torque limit value is merged into the change in the drive power that occurs by switching of the gear stage.

Furthermore, also in the case of off-upshift, the initial stage of the gear change is the inertia phase. After the torque phase begins (YES in ST205), the smaller torque limit value, that is, the torque limit value before switching of the gear stage is set as the target value. Then, at the time point at which the torque phase is terminated (YES in ST207), the torque limit value after switching of the gear stage is set as the target value, and thereafter, the torque limit value is gradually increased. In the case of the off-upshift, the accelerator operation amount Acc is extremely small, and the output of the engine 1 is equal to or lower than the torque limit value. Thus, the drive power is not changed.

The embodiment that has been described so far is merely illustrative and thus has no intention of limiting the configuration, application, and the like of the disclosure. For example, in the case of the upshift of the third gear→the fourth gear shown in FIG. 5 of the embodiment, the inertia phase is terminated (the time t3) during the gear change, and the change in the torque limit value is terminated before the friction engagement element on the engagement side (the clutch C4) stops slipping. However, the disclosure is not limited thereto. The change in the torque limit value may be terminated at the time point at which the inertia phase is terminated.

At least the part of the period in which the torque limit value is changed only needs to be included in the gear change period (that is, the period in which the gear stage is switched). For example, the change in the torque limit value may be terminated after switching of the gear stage is terminated. In addition, the disclosure is not limited to the gradual increase in the torque limit value. The torque limit value may be changed all at once in the gear change period.

In the embodiment, in the case where the torque limit value after switching of the gear stage is larger than the torque limit value before switching as in the case of the upshift, as shown in FIG. 5, the torque limit value starts being changed at the time point at which the torque phase is terminated during the gear change. However, the disclosure is not limited thereto. For example, the torque limit value may start being changed after a lapse of a specified time since the termination of the torque phase.

In the embodiment, in the case where the torque limit value after switching of the gear stage is smaller than the torque limit value before switching as in the case of the downshift, the torque limit value starts being changed before the torque phase is terminated during the gear change. However, the disclosure is not limited thereto. Even in the case where the torque limit value after switching is smaller than the torque limit value before switching, the torque limit value may start being changed after the termination of the torque phase.

The setting routine of the torque limit value shown in FIG. 6 in the embodiment is merely one example. A method of determining the abnormality of the hydraulic pressure control circuit 100 for each of the gear stages and a method of setting the torque limit value in accordance therewith are not limited to the example in FIG. 6, either.

In the embodiment, the case where the disclosure is applied to the FF vehicle, on which the automatic transmission 4 with the forward eight gears is mounted, is described as the one example. However, the disclosure is not limited thereto. For example, the disclosure can also be applied to a vehicle on which an automatic transmission with forward seven or fewer gears or forward nine or more gears is mounted, an FR (front-engine, rear-wheel-drive) vehicle, or a four-wheel-drive vehicle.

In the embodiment, the case where the disclosure is applied to the vehicle, on which the gasoline engine is mounted, is described as the one example. However, the disclosure is not limited thereto. The disclosure can also be applied to vehicles on which other engines such as a diesel engine are mounted. In addition, the vehicle is not limited to the vehicle on which only the engine is mounted as a drive power source. For example, the disclosure can also be applied to a hybrid vehicle (a vehicle on which an engine and an electric motor are mounted as the drive power sources).

When the torque limit value is set for the input torque to the automatic transmission for each of the transmission gear stages in the case of failure, the driver can be less likely to receive the sense of discomfort from the change in the drive power that occurs in conjunction with switching of the transmission gear stage. Thus, the disclosure is effective for application to a passenger car and the like.

What is claimed is:

1. A transmission gear control apparatus for an automatic transmission mounted on a vehicle, the automatic transmission including a stepped transmission gear mechanism configured to switch a transmission gear stage by engaging and disengaging of a plurality of friction engagement elements, the transmission gear control apparatus comprising:
    an electronic control unit configured to:
        i) determine whether a hydraulic pressure control circuit controlling hydraulic pressure supplied to the plurality of friction engagement elements is operating in an abnormal state;
        ii) in response to determining that the hydraulic pressure control circuit is operating in the abnormal state, set a limit value of a drive power source torque input to the transmission gear mechanism for each of the transmission gear stages; and
        iii) in response to the transmission gear stage being switched, change the limit value of the drive power source torque from a first target value before switching of the transmission gear stage to a second target value after switching of the transmission gear stage, such that at least a part of a time period in which the limit value of the drive power source torque is changed overlaps with a time period in which the transmission gear stage is switched.

2. The transmission gear control apparatus according to claim 1, wherein the electronic control unit is configured to change the limit value of the drive power source torque to the second target value before switching of the transmission gear stage is terminated.

3. The transmission gear control apparatus according to claim 2, wherein the electronic control unit is configured to change the limit value of the drive power source torque to the second target value before an inertia phase is terminated and a difference of rotation speed of engaged friction engagement elements of the plurality of friction engagement elements between an input side and an output side becomes zero in the time period in which the transmission gear stage is switched.

4. The transmission gear control apparatus according to claim 3, wherein the electronic control unit is configured to start changing the limit value of the drive power source torque before a torque phase is terminated and the difference of rotation speed of disengaged friction engagement elements of the plurality of friction engagement elements between the input side and the output side is generated, in the time period in which the transmission gear stage is switched when the limit value of the drive power source torque after switching of the transmission gear stage is smaller than the limit value of the drive power source torque before switching of the transmission gear stage.

5. The transmission gear control apparatus according to claim 1, wherein the electronic control unit is configured to start changing the limit value of the drive power source torque after a torque phase is terminated and a difference of rotation speed of disengaged friction engagement elements of the plurality of friction engagement elements between an input side and an output side is generated, in the time period in which the transmission gear stage is switched when the limit value of the drive power source torque after switching of the transmission gear stage is larger than the limit value of the drive power source torque before switching of the transmission gear stage.

6. The transmission gear control apparatus according to claim 5, wherein the electronic control unit is configured to start changing the limit value of the drive power source torque before the torque phase is terminated and the difference of rotation speed of disengaged friction engagement elements of the plurality of friction engagement elements between the input side and the output side is generated, in the time period in which the transmission gear stage is switched when the limit value of the drive power source torque after switching of the transmission gear stage is smaller than the limit value of the drive power source torque before switching of the transmission gear stage.

* * * * *